United States Patent [19]

Jenkins et al.

[11] Patent Number: 4,911,985
[45] Date of Patent: Mar. 27, 1990

[54] HIGH DENSITY POLYETHYLENE COMPOSITIONS CONTAINING POLYISOBUTYLENE RUBBER AND FILLER

[75] Inventors: Edwin A. Jenkins, Denham Springs; Jay P. Porter; William D. Ray, both of Baton Rouge, all of La.

[73] Assignee: Allied-Signal Inc., Morris Township, Morris County, N.J.

[21] Appl. No.: 313,320

[22] Filed: Feb. 21, 1989

[51] Int. Cl.⁴ .................... C08K 3/34; B32B 9/04; B32B 13/04

[52] U.S. Cl. .................... 428/446; 428/324; 428/331; 428/454; 428/521; 524/449; 524/451; 524/528

[58] Field of Search .......... 428/324, 331, 521, 446, 428/454; 524/449, 451, 528

[56] References Cited

U.S. PATENT DOCUMENTS

| | | | |
|---|---|---|---|
| 3,876,735 | 4/1975 | Bontinck et al. | 524/447 |
| 3,879,492 | 4/1975 | Bontinck | 523/100 |
| 3,993,718 | 11/1976 | Bontinck et al. | 524/447 |
| 4,082,880 | 4/1978 | Zboril . | |
| 4,237,176 | 12/1980 | Brueggemann et al. | 428/219 |
| 4,435,466 | 3/1984 | Kuhnel et al. | 428/521 |
| 4,447,479 | 5/1984 | Harrison et al. . | |
| 4,499,227 | 2/1985 | Bailey | 524/449 |
| 4,518,654 | 5/1985 | Eichbauer et al. | 428/913 |
| 4,528,235 | 7/1985 | Sacks et al. . | |
| 4,604,421 | 8/1986 | Mitsuno et al. . | |
| 4,618,528 | 10/1986 | Sacks et al. . | |
| 4,696,857 | 9/1987 | Sibilia et al. . | |

FOREIGN PATENT DOCUMENTS 202637 2/1984 New Zealand .

Primary Examiner—Herbert J. Lilling
Attorney, Agent, or Firm—Roger H. Criss

[57] ABSTRACT

A high density polyethylene composition comprising: from about 50 to about 95 weight percent of high density polyethylene;
from about 5 to 40 weight percent of polyisobutylene rubber; and
from about 1 to about 30 weight percent of a filler selected from the group consisting of mica, talc and mixtures thereof.

Films made from the compositions have improved tear-resistance and puncture-resistance.

15 Claims, No Drawings

HIGH DENSITY POLYETHYLENE COMPOSITIONS CONTAINING POLYISOBUTYLENE RUBBER AND FILLER

This application is a continuation of application Ser. No. 115,240 filed Oct. 30, 1987, abandoned.

BACKGROUND OF THE INVENTION

1. Field of the Invention

This invention relates to blends of high density polyethylene, and products made therefrom.

2. Description of the Prior Art

Paper-like films of polyethylene containing mica filler have been proposed in U.S. Pat. No. 4,082,880 to Zboril. It has also been proposed in New Zealand Patent 202,637 to form envelopes from a coextrusion in which the outer layer is a mica-filled high density polyethylene and the inner layer is low density polyethylene.

However, it has been found that film produced from mica-filled high density polyethylene have certain low physical properties which restricts their utilization in certain packaging applications, such as envelopes. For example, films made from mica-filled high density polyethylene have low tear resistance and low puncture resistance. As a result, such films and envelopes made from the films are susceptible to damage by rough handling.

It would be desirable to provide a modified high density polyethylene composition which exhibited improved physical properties, such that improved packaging material (such as envelopes) can be produced therefrom.

SUMMARY OF THE INVENTION

In accordance with this invention, there is provided a high density polyethylene composition comprising:
from about 50 to about 95 weight percent of high density polyethylene;
from about 5 to 40 weight percent of polyisobutylene rubber; and
from about 1 to about 30 weight percent of a filler selected from the group consisting of mica, talc and mixtures thereof.

It has been discovered that the addition of polyisobutylene to filled high density polyethylene compositions improves the tear-resistance and puncture resistance of films and other flexible shaped objects formed from such compositions.

DESCRIPTION OF THE PREFERRED EMBODIMENTS

The compositions of this invention are based on high density polyethylene. The term "high density" is well known in the art, and generally refers to densities in the range of about 0.94 to 0.965 grams per cubic centimeter. The term "polyethylene" as used herein includes homopolymers of ethylene and copolymers of at least about 85 weight percent ethylene with up to about 15 weight percent of one or more $C_3$ to $C_{10}$ alpha-olefins, such as 1-butene, 1-hexane, etc. Preferably, the copolymers include from about 0.1 to about 3 weight percent of the alpha-olefin comonomer.

The compositions of this invention comprise about 50 to about 95 weight percent of high density polyethylene, and preferably about 60 to about 85 weight percent. All weight percents given herein are based on the total weight of the composition. The polyethylene preferably has a melt flow index, measured by the procedures of ASTM D-1238, condition E, of about 0.1 to about 100 decigrams per minute, more preferably about 0.5 to 3 decigrams per minute.

The polyisobutylene rubber preferably has a molecular weight in the range of 750,000 to 2,500,000. The molecular weight is determined from intrinsic viscosity in diisobutylene at 20° C. The polyisobutylene may be of the type used in rubber modified high density polyethylene film resin.

The polyisobutylene is present in the compositions of this invention in amounts ranging from about 3 to about 40 weight percent, preferably about 5 to about 20 weight percent.

The fillers used in the present compositions include mica, talc and mixtures thereof. The mica is preferably white mica. White mica is the preferred filler when the composition is employed as the outer layer of a package since it provides a surface that is easy to write on with ink or pencil. The mica preferably is in the form of particles of the size in the range of about 1.9 to 88 microns. Talc (or micaceous talcum) can also be employed as the filler in the compositions of this invention. In particular, it is preferred to use talc when the high density polyethylene composition is employed as an intermediate or inner layer of a package. However, where smooth outer surfaces are not a problem, or are in fact desirable, talc may be used in the outer layer. The talc is preferably in the form of particles of a size in the range of about 0.5 tp 50 microns. It is also possible to utilize blends of mica and talc as the filter. The fillers may be uncoated or coated with, for example, a silane material.

The fillers of this invention are employed in amounts ranging from about 1 to about 30 weight percent, preferably about 3 to 15 percent.

The compositions of this invention can be prepared by any conventional technique. They can be dry or melt blended, in one or more steps. Preferably, the compositions are melt blended in a Banbury or similar mixer.

The following non-limiting examples are given to further illustrate the present invention.

EXAMPLE 1

A blend of high density polyethylene, mica and polyisobutylene was prepared by melt blending equal parts of two preblends in an Banbury mixer. The first preblend was a mixture in pellet form of high density polyethylene (melt index of 1.0 dg/min) and white mica (particle size of about 15 microns) in a weight ratio of 75:25 polyethylene to mica. The second preblend was a mixture in pellet form of high density polyethylene (melt index of 2.5 dg/min) and polyisobutylene (molecular weight of about 1,660,000) in a weight ratio of 66:34 polyethylene to polyisobutylene. Both preblends contained BHT (butylated hydroxytoluene) and DLTDP (dilaurylthiodipropionate) as conventional heat stabilizers.

The ingredients were blended at 177° C. in a Banbury mixer for a time sufficient to provide a homogeneous blend of about 70.5 percent high density polyethylene, 12.5 percent mica and 17 percent polyisobutene, as well as about 500 ppm each of BHT and DLTDP.

The blended composition was pelletized and the pellets were introduced into a Sterling extruder. The extruder had a 1.5 inch (38 mm) diameter circular die and a seamless tube was extruded and blown at a blow-up ratio of 2:1 to produce oriented film, which was cooled and taken upon on a roll.

The resulting film had a paper-like texture and an average thickness at 1.82 mils (0.046 mm). Both the blended resin and the film were tested for physical properties. The results are shown in Table 1. The film possessed excellent tear strength as measured by the Elmendorf tear test, and had a paper-like feel.

EXAMPLE 2

This is a comparative example. Example 1 was repeated except that the first preblend was blended with an equal amount of high density polyethylene having a melt index of 2.5 dg/min and without any polyisobutylene. The weight of the white mica filler was 12.5 percent.

The physical properties are also reported in Table 1. It can be seen that the tear strength is significantly below that of Example 1 in both the machine and transverse directions.

EXAMPLE 3

Example 1 was repeated except the first preblend was a mixture of high density polyethylene (melt index of 1.0 dg/min) and talc (particle size of about 1.5 microns) in a weight ratio of 75:25 polyethylene to talc. The final homogeneous blend included 70.5 percent of high density polyethylene, 12.5 percent of talc and 17 percent of polyisobutylene.

The physical properties are reported in Table 1. As can be seen, the film likewise exhibited excellent tear strength. The film has a smooth feel and was paper-like.

EXAMPLE 4

This is a comparative example. Example 2 was repeated except that the first preblend was that employed in Example 3. The weight of the talc in the final blend was 12.5 percent.

The physical properties are also reported in Table 1. As can be seen, the tear strength is significantly below that of Example 3 which included polyisobutylene in the blend.

TABLE 1

| | Film Characteristics | | | | | |
|---|---|---|---|---|---|---|
| Example No. | Filler (type) (wt. %) | Rubber (wt. %) | Density (g/cc) | Thickness (mils) | Elmendorf Tear** (gms/mil) MD | TD |
| 1 | Mica 12.5 | 17 | 1.0276 | 1.82 | 9.95 | 19.28 |
| 2* | Mica 12.5 | None | 1.0331 | 1.52 | 5.78 | 14.46 |
| 3 | Talc 12.5 | 17 | 1.0292 | 1.12 | 10.71 | 480.0 |
| 4* | Talc 12.5 | None | 1.0350 | 1.29 | 7.44 | 496.0 |

*Comparative Example
**per ASTM D-1922-67
MD = Machine Direction
TD = Transverse Direction

EXAMPLE 5

Example 1 was repeated, producing a resin blend that had a density of 1.0165 g/cc and a melt index of 2.52 dg/min. The film had an average gauge of 1.42 mils. The film was tested for physical properties. The results are given in Table 2.

EXAMPLE 6

Example 1 was again repeated, producing a resin blend that had a density of 1.0219 g/cc and a melt index of 3.09 dg/min. The film had an average of 1.65 mils. The physical properties are also reported in Table 2.

TABLE 2

| Property | ASTM | Example 5 | Example 6 |
|---|---|---|---|
| Yield tensile strength | D-882-79(A) | | |
| Psi (MPa) MD | | 1609 (11.09) | 1574 (10.85) |
| TD | | 960 (6.62) | 800 (5.52) |
| Break tensile strength | D-882-79(A) | | |
| Psi (MPa) MD | | 1609 (11.09) | 1484 (10.23) |
| TD | | 752 (5.18) | 558 (3.85) |
| Yield Elongation | D-882-79(A) | | |
| % MD | | 10.8 | 9.4 |
| TD | | 29.4 | — |
| Secant Modulus (1%) | D-638 | | |
| psi (MPa) MD | | 56,702 (390.9) | 42,751 (294.7) |
| TD | | 34,530 (238.0) | 25,289 (174.3) |
| Elmendorf Tear | D-1922-67 | | |
| gms/mil MD | | 8.88 | 10.1 |
| TD | | 9.34 | 19.1 |

The compositions of this invention are homogeneous blends of the three main ingredients. The compositions may include conventional additives, such as heat stabilizers, pigments (such as titanium dioxide, carbon black, and the like), antioxidants, antistatic agents, extrusion aids, UV stabilizers, etc.

The compositions of this invention are particularly useful in preparing multilayer films used for packaging applications, such as envelopes. They may also be employed as mono-layer films. In a multilayer construction, the compositions may be coextruded or laminated with other layers such as low density polyethylene, linear lower density polyethylene, etc. As pointed out above, for packaging applications it is preferred that the mica-filled compositions be employed as the outer layer, preferably in a multiply construction. It has been found that envelopes produced from such blends as the outer layer provided excellent mechanical properties, including improved tear strength and puncture resistance compared with films that only contain mica and high density polyethylene. The films can easily be written on with pen or pencil.

What is claimed is:

1. A high density polyethylene composition suitable for use in forming one layer of a multiply envelope construction having improved tear strength and puncture resistance, said composition consisting of:
   from about 50 to about 95 weight percent of high density polyethylene;
   from about 5 to about 40 weight percent of polyisobutylene rubber; and
   from about 1 to about 30 weight percent of a filler selected from the group consisting of mica, talc and mixtures thereof.

2. The composition of claim 1 wherein said filler is mica.

3. The composition of claim 2 wherein said polyisobutyene rubber has a molecular weight of about 750,000 and to 2,5000,000 as determined from the intrinsic viscosity in diisobutylene at 20° C.

4. The composition of claim 3 comprising from about 60 to 85 weight percent of high density polyethylene, 5 to 20 weight percent polyisobutylene and 3 to 15 weight percent mica.

5. The composition of claim 4 wherein said mica is white mica.

6. The composition of claim 1 consisting of from about 60 to 85 weight percent of high density polyethylene, 5 to 20 weight percent polyisobutylene and 3 to 15 weight percent mica.

7. The composition of claim 6 wherein said filler is talc.

8. The composition of claim 1 wherein said filler is talc.

9. A film prepared from the composition of claim 1.

10. A film prepared from the composition of claim 4.

11. A multiply film construction including as one layer thereof the film of claim 9.

12. A multiply film construction including an outer layer formed from the composition of claim 1.

13. The composition of claim 1 consisting of about 70.5 weight percent of high density polyethylene, 17 weight percent polyisobutylene and 12.5 weight percent mica.

14. The composition of claim 1 consisting of about 70.5 weight percent of high density polyethylene, 17 weight percent polyisobutylene and 12.5 weight percent talc.

15. A multiply construction available for use in forming an envelope having improved tear strength and puncture resistance, said multiply construction including as one layer thereof a film prepared from a composition consisting of:

from about 50 to about 95 weight percent of high density polyethylene;

from about 5 to about 40 weight percent of polyisobutylene rubber; and from about 1 to about 30 weight percent of a filler selected from the group consisting of mica, talc and mixtures thereof.

* * * * *

UNITED STATES PATENT AND TRADEMARK OFFICE
CERTIFICATE OF CORRECTION

PATENT NO. : 4,911,985

DATED : March 27, 1990

INVENTOR(S) : Edwin Alfred Jenkins, et al.

It is certified that error appears in the above-identified patent and that said Letters Patent is hereby corrected as shown below:

Column 6, claim 15, line 1, "available" should read --suitable--.

Signed and Sealed this

First Day of September, 1992

Attest:

DOUGLAS B. COMER

Attesting Officer

Acting Commissioner of Patents and Trademarks